United States Patent
Engel et al.

(10) Patent No.: US 12,072,412 B2
(45) Date of Patent: Aug. 27, 2024

(54) BROADBAND RADIO FREQUENCY IMAGING SURFACE

(71) Applicant: Battelle Memorial Institute, Columbus, OH (US)

(72) Inventors: Mollie A. Engel, Columbus, OH (US); Douglas A. Thornton, Upper Arlington, OH (US); Raphael J. Welsh, Powell, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 18/391,900

(22) Filed: Dec. 21, 2023

(65) Prior Publication Data
US 2024/0118412 A1    Apr. 11, 2024

Related U.S. Application Data

(63) Continuation of application No. PCT/US2023/028654, filed on Jul. 26, 2023.
(Continued)

(51) Int. Cl.
*G01S 13/89* (2006.01)
*G01S 7/03* (2006.01)
(Continued)

(52) U.S. Cl.
CPC ............... *G01S 13/89* (2013.01); *G01S 7/03* (2013.01); *G01S 7/4021* (2013.01); *G01S 13/0209* (2013.01); *H04B 1/006* (2013.01)

(58) Field of Classification Search
CPC .......... G01S 13/89; G01S 7/03; G01S 7/4021; G01S 13/0209; H04B 1/006; H04B 1/0057
(Continued)

(56) References Cited

U.S. PATENT DOCUMENTS 11,619,723 B2 * 4/2023 Xu .................. G01S 7/4915
                                          348/135
2006/0214832 A1 * 9/2006 Lee .................. H01Q 21/061
                                          342/179
(Continued)

OTHER PUBLICATIONS

International Search Report of Application No. PCT/US23/28654 mailed Oct. 20, 2023.
(Continued)

*Primary Examiner* — Frantz B Jean
(74) *Attorney, Agent, or Firm* — Lippes Mathias LLP

(57) ABSTRACT

A broadband RF imaging device includes a broadband RF aperture array, at least one RF receiver, and a computer. The at least one RF receiver has short RF connections with the broadband RF aperture array, e.g. length 10 meters or less. The computer has a digital data connection to the at least one RF receiver. Each RF receiver is configured to receive broadband RF signal data over a sampling time interval from the broadband RF aperture array, and to digitize the broadband RF signal data to generate digitized broadband RF signal data, and to store the digitized broadband RF signal data locally at the RF receiver. The computer receives the digitized broadband RF signal data stored locally at the at least one RF receiver, and is programmed to reconstruct an RF image from the digitized broadband RF signal data received from the at least one RF receiver.

20 Claims, 4 Drawing Sheets

Related U.S. Application Data

(60) Provisional application No. 63/395,515, filed on Aug. 5, 2022.

(51) Int. Cl.
*G01S 7/40* (2006.01)
*G01S 13/02* (2006.01)
*H04B 1/00* (2006.01)

(58) Field of Classification Search
USPC ......................................................... 348/135
See application file for complete search history.

(56) References Cited

U.S. PATENT DOCUMENTS

| | | | |
|---|---|---|---|
| 2018/0329052 A1* | 11/2018 | Gallagher | G01V 3/36 |
| 2019/0079175 A1 | 3/2019 | Yamanouchi | |
| 2020/0142047 A1* | 5/2020 | Zwirn | G01S 13/003 |
| 2020/0191945 A1* | 6/2020 | Leabman | G01S 7/282 |
| 2020/0343927 A1 | 10/2020 | Welsh et al. | |
| 2020/0374028 A1 | 11/2020 | Welsh | |
| 2021/0133445 A1* | 5/2021 | Birger | H04N 5/30 |
| 2023/0206413 A1* | 6/2023 | McCall | H04N 23/55 |
| | | | 348/135 |

OTHER PUBLICATIONS

Written Opinion of Application No. PCT/US2023/28654 mailed Oct. 20, 2023.

* cited by examiner

BROADBAND RADIO FREQUENCY IMAGING SURFACE

This application is a continuation of PCT Application No. PCT/US2023/028654, filed Jul. 26, 2023, which claims the benefit of U.S. Provisional Application No. 63/395,515 filed Aug. 5, 2022, which is incorporated herein by reference in its entirety.

BACKGROUND

The following relates to the radio frequency (RF) imaging arts, gigahertz (GHz) imaging arts, broadband RF imaging arts, and to the like.

There are various situations which can benefit from obtaining a high resolution broadband RF image of a physical environment. For example, such imaging can be used to identify dead RF zones in the environment due to destructive RF interference, to test RF emitters or emitter arrays, to assess efficacy of a short-burst communication system, and so forth.

BRIEF SUMMARY

In accordance with some nonlimiting illustrative embodiments disclosed herein, a broadband RF imaging device includes a broadband RF aperture array, at least one RF receiver and a computer. The broadband RF aperture array has at least four array elements, and has a bandwidth of at least 700 MHz. The at least one RF receiver has RF connections with the array elements of the broadband RF aperture array. The RF connections are of length 10 meters or less. The computer has a digital data connection to the at least one RF receiver. Each RF receiver is configured to receive broadband RF signal data over a sampling time interval from the broadband RF aperture array, and to digitize the broadband RF signal data to generate digitized broadband RF signal data, and to store the digitized broadband RF signal data locally at the RF receiver. The computer is programmed to receive the digitized broadband RF signal data stored locally at the at least one RF receiver and to reconstruct an RF image from the digitized broadband RF signal data received from the at least one RF receiver. In some embodiments of the broadband imaging device, the broadband RF aperture array is made up of at least 8 elements, where each element provides an independent RF capture surface, and the RF connections with the broadband RF aperture array include RF connections with elements of the broadband RF aperture array, with at least one element attached to each RF connection.

In accordance with some nonlimiting illustrative embodiments disclosed herein, a broadband RF imaging method is disclosed. Over a sampling time period, a broadband RF signal is received from a physical environment with a broadband RF aperture array having a bandwidth of at least 700 MHz connected with at least one RF receiver having RF connections with the broadband RF aperture array of length 10 meters or less. The received broadband RF signal is digitized to produce a digitized broadband RF signal using the at least one RF receiver, and the digitized broadband RF signal is stored locally at the at least one RF receiver. After the sampling time period is complete, the digitized broadband RF signal stored locally at the at least one RF receiver is transferred to a computer. Using the computer, an RF image of the physical environment is reconstructed from the digitized broadband RF signal data transferred from the at least one RF receiver.

In accordance with some nonlimiting illustrative embodiments disclosed herein, a in some nonlimiting illustrative embodiments disclosed herein a broadband RF test device includes a differential segmented aperture (DSA) having a bandwidth of at least 700 MHz and comprising a two-dimensional (2D) array of electrically conductive tapered projections. At least one RF receiver is further provided, which has RF connections with the DSA to receive RF signal data from the DSA. The at least one RF receiver is configured to digitize the received RF signal data and locally store the digitized RF signal data at the at least one RF receiver. A computer is connected to receive the digitized RF signal data locally stored at the at least one RF receiver, and is programmed to perform processing of the digitized RF signal data received from the at least one RF receiver.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

DETAILED DESCRIPTION

Figure 1:
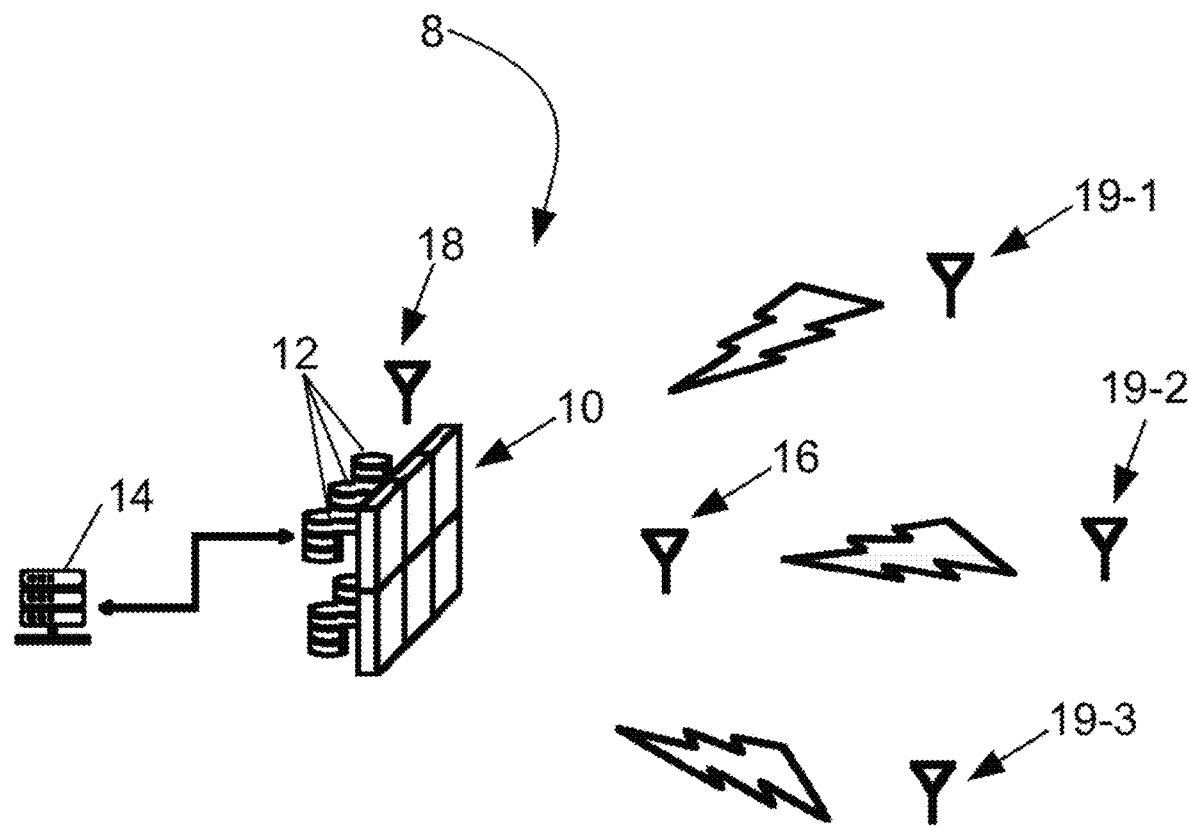
FIG. 1 diagrammatically shows a broadband RF imaging or testing device that includes a broadband RF aperture array.

Various RF imaging tasks would benefit from the ability to record, with fine spatial and temporal granularity, how a multi-source or multi-path wavefront meets a surface that is multiple wavelengths in size. Additionally, this surface should have wide instantaneous bandwidth, for example 500 MHz or higher in some embodiments, and a large total bandwidth, for example at least 700 MHz in some embodiments, and from 700 MHz to 6 GHz in some more specific embodiments. A scalable approach would be beneficial in providing surfaces of variable sizes and shapes, and the ability to start small with minimal cost and complexity, and then expand into larger systems as confidence and scope of application builds.

An RF imaging surface is a calibrated scientific instrument that enables creation of a digital representation of how RF energy flows into the RF imaging surface. Such data can capture how the multiple sources of the wave arrived at the surface, providing real world measurements to validate the performance of the system under test. A second usage is to understand how a wave travels over multiple paths from the same emitter to the surface, and how those paths differ based upon frequency. The resulting RF image of the physical environment provides spatial resolution and, in some embodiments, also temporal resolution. Such a broadband RF imaging device can be used to test a specific RF system, or perform other RF imaging tasks.

Acquisition of a broadband RF image of a physical environment with high spatial and temporal resolution is challenging for a number of reasons. First, the system should be capable of acquiring RF over the target bandwidth, which may be large for some tasks. In some nonlimiting illustrative examples herein, it is desired to collect all RF signals over a broadband ranging from 600 MHz to 8 GHz, which translates to the RF antenna being capable of receiving RF signals as low as 600 MHz and as high as 8 GHz (as well as all frequencies in-between). In some other nonlimiting illustrative examples herein, it is desired to collect all RF signals over a broadband ranging from 700 MHz to 6 GHz, which translates to the RF antenna being capable of receiving RF signals as low as 700 MHz and as high as 6 GHz (as well as all frequencies in-between). These are merely nonlimiting illustrative examples.

A further challenge in constructing such a broadband RF imaging device is that the quantity of collected data and the rate of data acquisition is large. To avoid aliasing, the sampling rate should be at least twice the highest frequency to be received, e.g. 16 GHz sampling rate for the foregoing example. This corresponds to a high data rate. In some practical designs, the amount of digitized data (at 12-bit resolution) collected in such an acquisition is on the order of 0.5-1.0 TB (terabyte) per second, which greatly exceeds the bandwidth of most high speed Internet connections as of year 2022.

In the following, some illustrative devices and methods for performing such RF testing or imaging are described.

With reference to FIG. 1, a broadband radio frequency (RF) imaging or testing device 8 includes a broadband RF aperture array 10, at least one RF receiver 12 having RF connections with the RF aperture array 10, and a computer 14, such as an illustrative server computer 14. The broadband RF aperture array 10 is configured to receive RF signal over a broadband, such as over a bandwidth of at least 700 MHz in some embodiments. The system may further include a calibration antenna or other RF source 16 positioned at a predefined location respective to the broadband RF aperture array 10. The calibration RF source 16 emits a calibration RF signal that is used to perform frequency and/or phase correction of digitized broadband RF signal data received by the RF aperture array 10, based on the predefined location of the RF emitter 16 and a portion of the digitized broadband RF signal data representing the calibration RF signal. This provides a low cost calibration by transmitting a known signal at a precise location that is then post-processed to remove frequency and phase errors. This approach eliminates the need to tight phase synchronization between each RF receiver 12 and enables the synchronization to happen during post processing. Alternatively, a synchronization signal can be generated and distributed through constant length paths to the individual RF receivers. The purpose of the broadband RF imaging or testing system 8 is to receive and process RF signal data from a physical environment that may include various RF sources, such as an illustrative target RF source 18 and illustrative distributed emitters 19-1, 19-2, and 19-3 (for example, possibly corresponding to interfering RF noise sources). The processing may, for example, include reconstructing an RF image of the physical environment. The reconstructed RF image may have spatial dimensions, and may optionally further include a time dimension.

Figure 2:
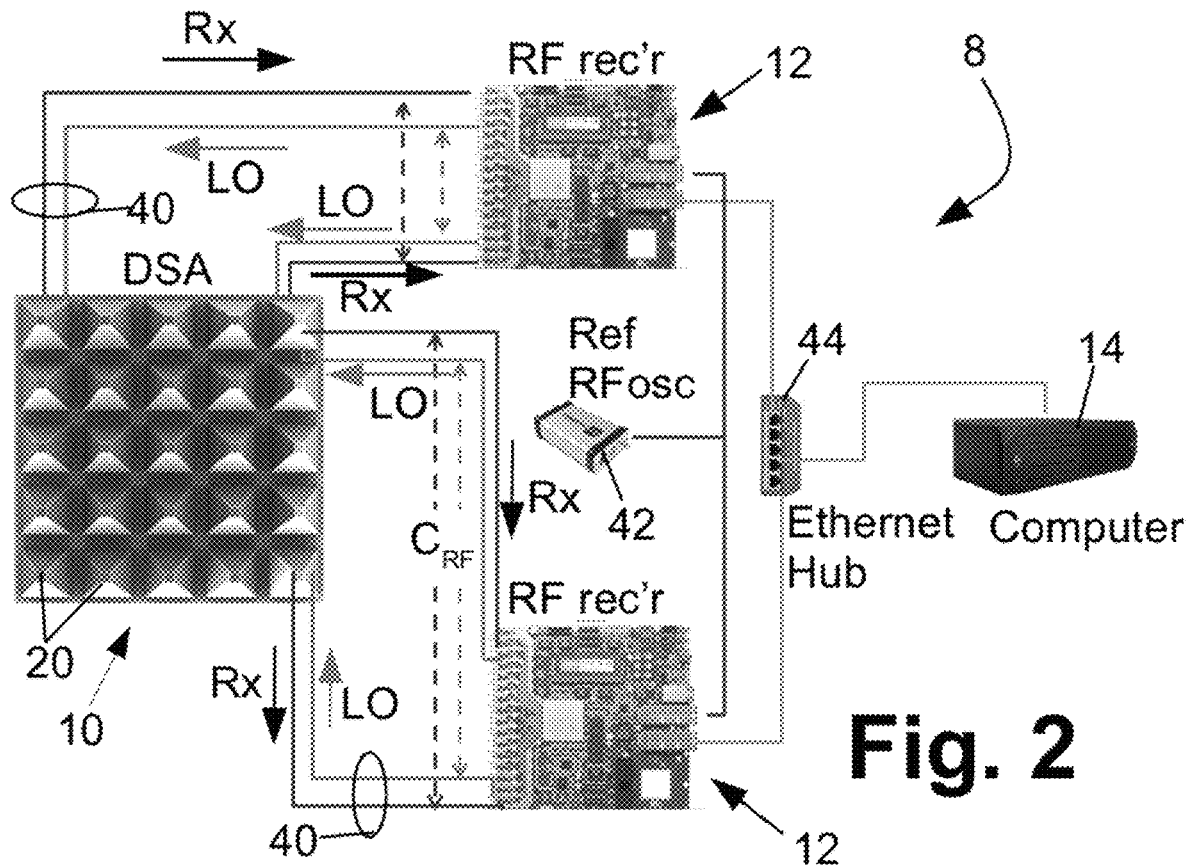
FIGS. 2, 3, and 4 diagrammatically show embodiments of a broadband RF aperture array comprising at least one DSA.
Figure 3:
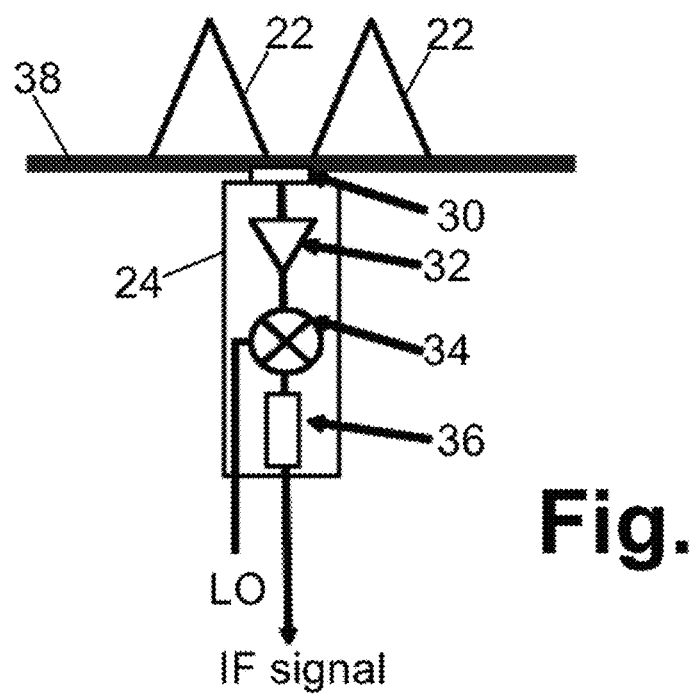

With reference to FIGS. 2 and 3, in some embodiments the broadband RF aperture array 10 comprises a differential segmented aperture (DSA) 10. Some suitable DSA designs are described, by way of nonlimiting illustrative example, in Welsh et al., U.S. Pub. No. 2020/0343929 A1 published Oct. 29, 2020 which is incorporated herein by reference in its entirety. As seen in FIG. 2, which shows a front view of the DSA 10, the DSA 10 includes a two-dimensional (2D) array of electrically conductive tapered projections 20. As seen in the partial side view of FIG. 3, neighboring pairs of the electrically conductive tapered projections 22 form RF pixels. FIG. 3 further diagrammatically shows on-board electronics 24 of the DSA 10 (or more specifically, shows a portion of the on-board electronics 24 for the illustrated single RF pixel) which are configured to heterodyne RF signals received by the RF pixel comprising the neighboring pair of the electrically conductive tapered projections 22 to an intermediate frequency (IF). More particularly, the on-board electronics 24 include a balun 30 providing a single-ended output in response to the differential RF signal input from the two projections 22 of the pair; an optional low noise amplifier (LNA) 32 to boost the RF signal; an RF mixer 34 for heterodyning the received RF signal to the IF frequency, and an optional anti-aliasing filter 36. It is to be appreciated that this is merely an illustrative example, and that other configurations of the on-board electronics 24 are alternatively contemplated. In some embodiments, the baluns 30 are chip baluns suitably mounted on a backside of a board 38 on which the 2D array of electrically conductive tapered projections 22 are mounted. Other design aspects described in Welsh et al., U.S. Pub. No. 2020/0343929 A1 may be suitably incorporated into the DSA 10.

The DSA 10 provides a broadband RF aperture array with spatial resolution corresponding to the spacing of the projections 22 of the 2D array of projections 22. The tapering of the electrically conductive tapered projections 22 presents a separation between the two electrically conductive tapered projections 22 of an RF pixel (e.g. as in FIG. 3) that varies with the "height", i.e. with distance "above" the support 38 of the electrically conductive tapered projections 22. This provides broadband RF capture since a range of RF wavelengths can be captured corresponding to the range of separations between the adjacent electrically conductive tapered projections 20 introduced by the tapering. The RF aperture array 10 is thus a differential segmented aperture (DSA) 10, and has differential RF receive elements corresponding to the adjacent pairs of electrically conductive tapered projections 22, referred to herein as RF pixels.

As further diagrammatically shown in FIG. 2, the RF receivers 12 have RF connections 40 with the broadband RF aperture array 10. The RF connections 40 can be coaxial RF cables, triaxial RF cables, or the like. Alternatively, the RF connections 40 can be direct card-to-card connectors without cables in between, or the RF connections 40 can be printed circuitry of a circuit board of the broadband RF aperture array 10, for example by having the electronic components making up the RF receiver 12 installed on a backside of a circuit board of the broadband RF aperture array 10, thereby reducing RF signal transit distance The illustrative RF connections 40 include an LO connection delivering the LO signal from the RF receiver 12 to the DSA 10, and an Rx line delivering the RF signal received by the DSA 10 (after processing by the on-board electronics 24) to the RF receivers 12. The RF connections 40 have a length (denoted $C_{RF}$ in FIG. 2) of length 10 meters or less in some embodiments to limit propagation delay, although longer RF connections are contemplated if the resulting propagation delay is acceptable for a given application.

The broadband RF signals collected by the RF pixels of the DSA 10 and frequency-shifted to the IF frequency and optionally otherwise analog-processed (e.g. amplification by LNA 32, filtering by filter 36) are transmitted via the RF connections 40 to the RF receivers 12, which are programmed or otherwise configured (e.g. by suitable design of an application-specific integrated circuit, or ASIC, or a suitably programmed field-programmable gate array, or FPGA, or so forth) to receive the broadband RF signal data over a sampling time interval from the DSA or other broadband RF aperture array 10, and to digitize the broadband RF signal data to generate digitized broadband RF signal data, and to store the digitized broadband RF signal data locally at the RF receiver 12. Thus, the RF receivers serve as software-defined radio (SDR) components connected to the DSA 10 which serves as the antenna, and the RF receivers 12 further perform digitization of the RF signal data and provide local buffer storage for the broadband RF imaging or testing device 8. This enables high resolution RF signal data over the area of the RF aperture array 10 to be collected over a sampling time interval of a duration chosen to acquire the desired RF image of the physical environment (e.g., as represented by the illustrative distributed emitters 19-1, 19-2, and 19-3 of FIG. 1). The sampling time interval is chosen based on the expected temporal characteristics of the physical environment being RF-imaged. For example, if the physical environment comprises a short-burst communication system, then the sampling time interval may be chosen to be sufficient to capture a single burst from that communication system, or a few bursts.

The use of the RF receivers 12 advantageously enables the broadband RF imaging or testing device 8 to acquire the RF signal data over the sampling time interval at high spatial and temporal resolution. As previously noted, in some practical applications the amount of digitized data (at 12-bit resolution) collected in such an acquisition may be on the order of 0.5-1.0 TB (terabyte) per second, which greatly exceeds the bandwidth of most high speed Internet connections as of year 2022. However, high-speed RF receivers are capable of collecting and processing (e.g. digitizing) data at such a high data rate. In combination with suitably short RF connections 40 to the DSA 10, the RF receivers 12 thus provide local digitization of the collected broadband RF data and local buffer storage for that digitized RF signal data. This buffer is sized to store the data generated by the RF receiver for the maximum sampling period. For each, if the sampling period is 100 milliseconds, the sampling rate 10 GHz, and 4 bytes are generated per sample, each element will generate 32 gigabits of data, thus an 8 element RF receiver would require 256 gigabits of storage buffer. By way of nonlimiting illustrative example, the RF receiver 12 may, for example, be HTG-ZRF-16 RF receiver platforms (available from HiTech Global, LLC, San Jose, CA, USA) whose RF input pins are connected to designated RF pixels of the DSA 10 by the RF connections 40, and which are programmed or otherwise configured to digitize and store received RF data. Alternatively, a custom-built RF receiver can be used, as previously noted optionally with the RF receiver components mounted directly to a backside of a circuit board of the DSA 10, or connected with the DSA by direct card-to-card connectors. The illustrative broadband RF imaging or testing device 8 of FIG. 2 includes two RF receivers 12. However, more generally the number of RF receivers can be as few as one, or two, or three, or as many as needed to receive, digitize and locally store the received RF signal data. If multiple RF receivers 12 are employed, then each RF receiver 12 in general receives, digitizes, and stores RF signal data from some assigned subset of the RF pixels of the DSA 10. Hence, the device 8 is scalable to higher spatial channels (i.e. a DSA with more RF pixels) and/or to higher temporal resolution by adding a suitable number of RF receivers 12.

If multiple RF receivers 12 are employed, then they should be synchronized in time. This is because the RF signal data collected by the multiple RF receivers 12 needs to have synchronized time stamps in order to be properly combined during processing by the computer 14 to reconstruct the RF image or generate other useful output. To this end, as shown in FIG. 2, the illustrative broadband RF imaging device 8 further includes a reference oscillator 42, which outputs a reference signal to the RF receivers 12 to synchronize the RF receivers 12. In some embodiments, the reference oscillator 42 comprises a Global Positioning System (GPS) disciplined oscillator 42. A GPS disciplined reference oscillator (also sometimes called a GPS clock) combines a crystal oscillator and a GPS receiver that disciplines the crystal output in a tracking loop electrical configuration. Along with optional features such as temperature control, the illustrative GPS disciplined oscillator 42 can provide timing accuracy on the order of nanoseconds and stability on the order of parts per trillion.

The digitized RF signal data can be stored at the RF receivers 12 for the duration of the sampling time interval. thereafter, the digitized RF signal data locally stored at the RF receivers 12 can be transferred to the computer 14, for example by an illustrative Ethernet hub 44. The maximum data transfer rate of the Ethernet connection is typically too slow to transfer the digitized RF signal data in real-time, that is, as it is collected. More generally, the maximum rate at which the data is transferred from the RF receiver 12 to the computer 14 is slower than the rate at which the data are captured at the RF receiver 12. However, the transfer over the Ethernet 44 is performed after collection and buffering of the digitized RF signal data at the RF receivers 12, and hence the Ethernet transfer can be slower without resulting in loss of data (and hence without loss in spatiotemporal resolution).

The computer 14 is programmed to perform processing of the digitized RF signal data received from the RF receivers 12. This processing can include, for example, performing frequency and/or phase correction of the digitized RF signal data based on the predefined location of the RF emitter 16 (see FIG. 1) and that portion of the digitized broadband RF signal data representing the calibration RF signal. (For example, the calibration RF signal may be output only for a brief sub-interval of the sampling time interval, and the RF signal data from that brief sub-interval is then used to perform the frequency and/or phase correction of the digitized RF signal data). The processing to reconstruct the RF image may include, for example, dividing the sampling time interval into a sequence of time increments and, for each time increment, generating a map of the (corrected) RF signal received at each RF pixel of the DSA 10 over that time increment. Such a map created for each successive time increment of the sampling time interval. The processing to reconstruct the RF image could optionally include further operations such as selecting one or a few of those time increment maps that are representative of the RF signals of the physical environment of interest. For example, if a short-burst communication system is being analyzed, then the time increment RF image that is selected may be one which includes the strongest signal from the short-burst communication system (determined based on factors such as total received RF power and/or characteristics of the RF power such as periodicity or other Fourier domain characteristics or so forth). The processing can employ finite element analysis using a simulator such as a High Frequency Structure Simulator (HFSS) or MATLAB. Through such analysis, the time, location, and direction of arrival of any signal within the sampling bandwidth can be found across the RF imaging array.

As previously noted, use of multiple RF receivers 12 can be useful in scaling up the system 8. Another way to scale up the system is to increase the number of RF pixels, which enables increasing the size of the RF aperture array and hence the size of the RF image. However, increasing the size of the DSA 10 can become unwieldy as more RF pixels corresponds to more tapered projections 22 in the 2D array of electrically conductive tapered projections 22. Moreover, it may be desirable for the broadband imaging or testing system 8 to be modular, e.g. to have a smaller 2D array of electrically conductive tapered projections 22 for some tasks and a larger 2D array of electrically conductive tapered projections 22 for other tasks.

Figure 4:
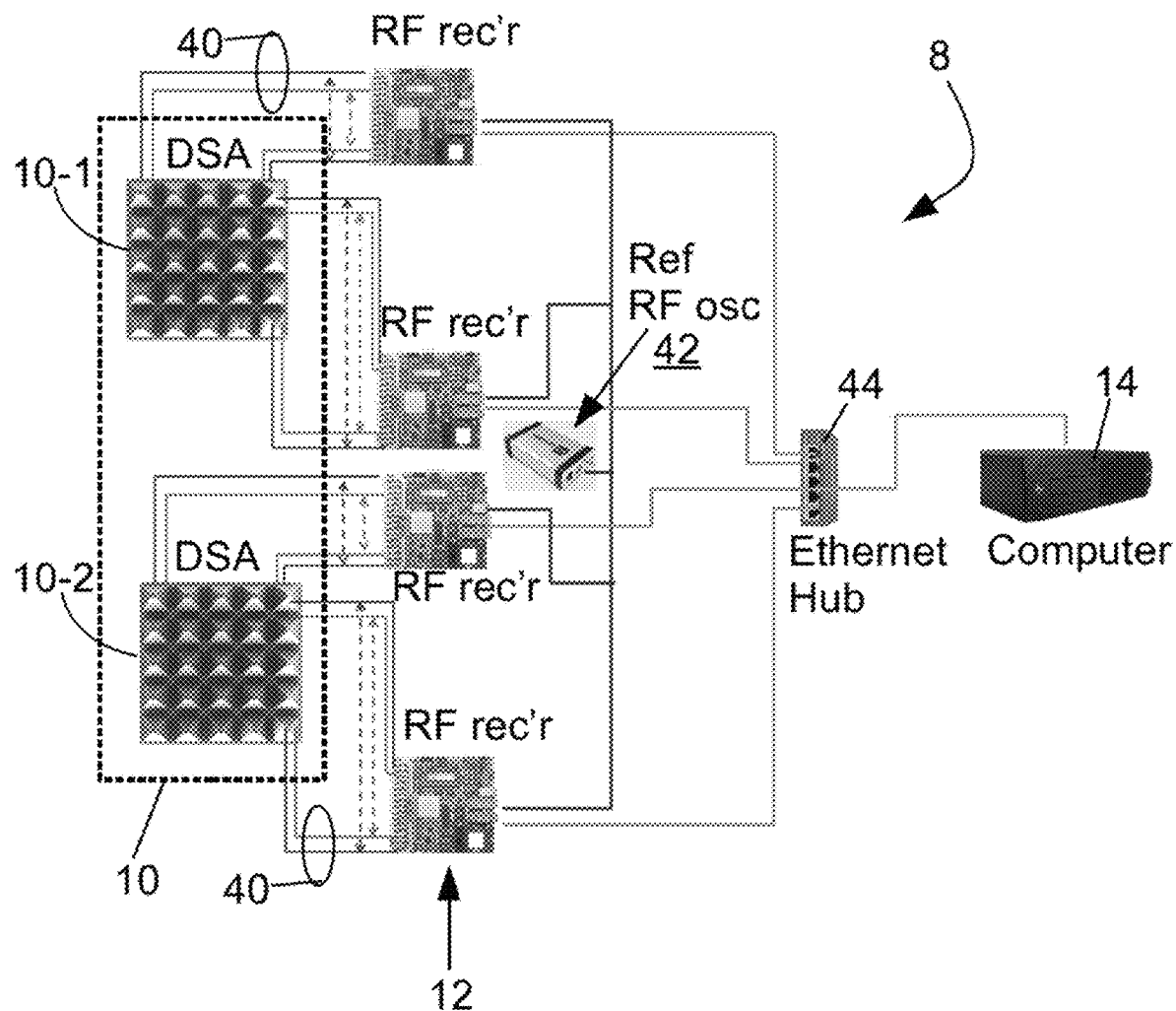

With reference to FIG. 4, one way to achieve this is to dispose the 2D array of electrically conductive tapered projections 22 on two or more substrates 38, so that the DSA 10 comprises a corresponding two or more DSA tiles (e.g. a first illustrative DSA tile 10-1 and a second illustrative DSA tile 10-2 shown in FIG. 4). Each DSA tile has RF connections 40 with at least one RF receiver 12 (e.g., each DSA tile 10-1 and 10-2 has RF connections 40 with two RF receivers 12 in the example of FIG. 4). While two DSA tiles 10-1 and 10-2 are shown by way of illustration, more generally the number of DSA tiles can be as few as one (e.g. as in FIG. 2), or can be two, three, four, or as many as needed to span a desired RF aperture area. Moreover, the DSA tiles can be arranged in various geometries, e.g. to span a square aperture or a rectangular aperture of a desired aspect ratio, or to approximately span a circular RF aperture area or so forth. As another example, the DSA 10 of FIG. 1 is constructed as a 2×3 array of six DSA tiles. When using multiple DSA tiles, the calibration RF source 16 (see FIG. 1) is beneficial to facilitate performing frequency and/or phase correction of the digitized broadband RF signal data received by the RF aperture array 10, as previously described.

Figure 5:
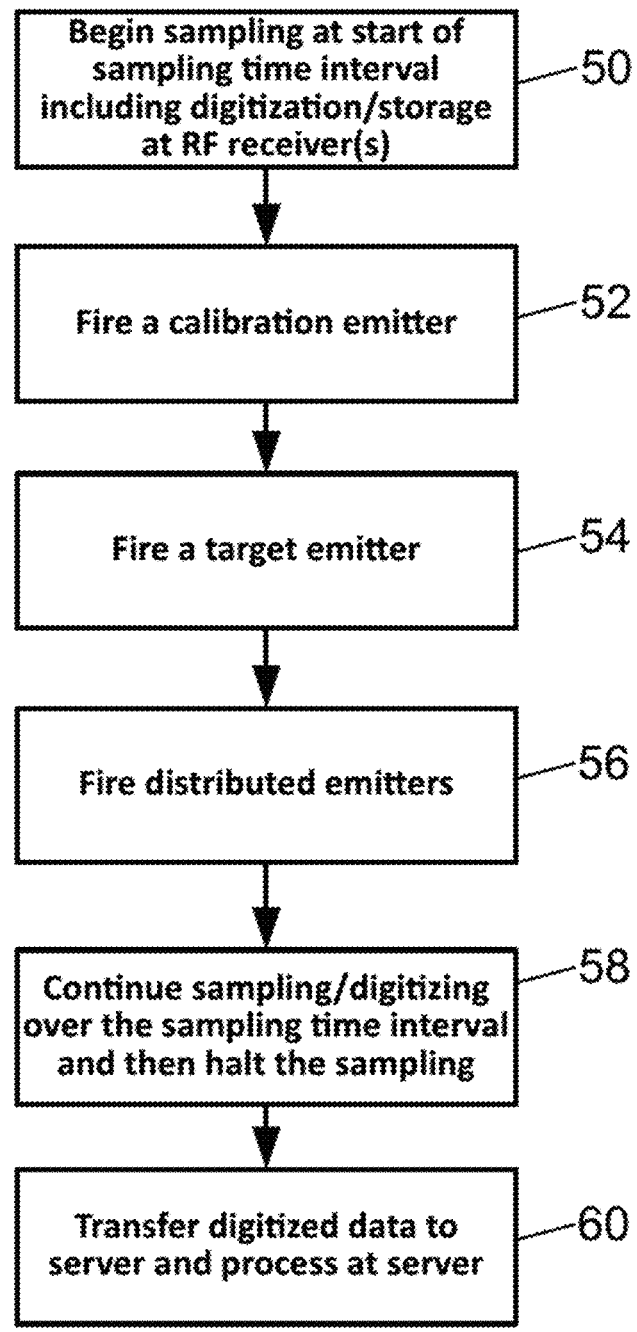
FIG. 5 shows a broadband RF imaging method by way of a flowchart.

With reference to FIG. 5, a broadband RF imaging method which may suitably employ a broadband RF imaging device such as those described with illustrative reference to FIGS. 1-4 is presented. In an operation 50, broadband RF sampling is initiated, thus starting the sampling time interval. The operation 50 includes the digitalization and storage of the RF signal data at the RF receivers 12. In an operation 52 the calibration emitter 16 is fired, while still collecting the RF data, to provide RF data for the later performance of the frequency and/or phase correction by the computer 16. In operations 54 and 56 the physical environment is established which is to be RF-imaged or RF tested. In this illustrative example this includes operating the target emitter 18 to emit a target RF signal in operation 54 and firing distributed emitters 19-1, 19-2, and 19-3 in an operation 56. In an operation 58 the sampling/digitizing continues for the duration of the sampling time interval, after which the sampling is halted. In an operation 60, the digitized data locally stored at the RF receivers 12 is transferred to the computer 16 and processed by the computer 16 to reconstruct the RF image. It will be appreciated that the operations 52, 54, and 56 can be performed in substantially any order, and/or may overlap in time, so long as they are performed during the sampling time interval.

In one illustrative embodiment, the DSA array 10 acts as a target, receiving RF energy, filtering, digitizing, and then temporarily storing the generated data in the RF receivers 12. The DSA array 10 is scalable as described with reference to FIG. 4, and can be built in (by way of nonlimiting illustrative example) 6-inch by 6-inch DSA tiles. The illustrative 2×3 grid of DSA tiles making up the DSA of FIG. 1 could, for example, create a 12-inch by 18-inch target aperture if the individual DSA tiles are sized 6-inch by 6-inch. This size is an illustrative example, which is chosen to provide multiple wavelength size with controlled complexity. A larger (or smaller) target can be similarly constructed. The RF signal acquisition (e.g., using the on-board electronics of FIG. 3 and the RF receiver 12) may suitably employ a sample and hold function, with a multi-second sample depth. Each element of the array, 192 in all for the illustrative example, is independently captured. In one specific illustrative example, each DSA tile is a 6-inch by 6-inch block containing 32 channels of receive signal chain, 16 in each polarization. Thus 96 channels are available in H-polarization and 96 in V-polarization. To achieve a synchronized reception on this high number of channels, the reference oscillator 42 may be a 10 MHz GPS disciplined oscillator connected to a network hub via gigabit ethernet. In one specific nonlimiting illustrative embodiment for transferring the digitized RF signal data from the RF receivers 12 to the computer 14, a VITA-49 open standards protocol may be used. In one specific nonlimiting illustrative embodiment, the RF receivers 12 can operate with an 800 MHz IF and are digitized with 12-bit resolution at ~2GSPS. Each RF receiver 12 can store ~1 GB worth of samples per channel. If additional sample depth is desired then memory can be increased, for example by adding additional RF receivers 12.

In the illustrative example of FIG. 1, the target emitter 18 is separate from the DSA array 10 of the target. This approach substantially reduces the cost because it eliminates 192 transmit signal chains. However, it gives the target emitter the ability to only broadcast a signal with fixed directionality, i.e., no beam forming is available. In other embodiments, the DSA 10 itself (or some portion of its RF pixels) may serve as the target emitter, for example in a test in which RF reflection is to be measured.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A broadband radio frequency (RF) imaging device comprising:
    a broadband RF aperture array having at least four array elements and having a bandwidth of at least 700 MHZ;
    at least one RF receiver having RF connections with the array elements of the broadband RF aperture array, the RF connections being of length 10 meters or less; and
    a computer having a digital data connection to the at least one RF receiver;
    wherein each RF receiver is configured to receive broadband RF signal data over a sampling time interval from the broadband RF aperture array, and to digitize the broadband RF signal data to generate digitized broadband RF signal data, and to store the digitized broadband RF signal data locally at the RF receiver; and
    wherein the computer is programmed to receive the digitized broadband RF signal data stored locally at the at least one RF receiver and to reconstruct an RF image from the digitized broadband RF signal data received from the at least one RF receiver.

2. The broadband RF imaging device of claim 1 wherein the broadband RF aperture array comprises a differential segmented aperture (DSA).

3. The broadband RF imaging device of claim 2 wherein each RF receiver generates local oscillator (LO) signal that is transmitted to the broadband RF aperture array via the RF connections, and the DSA includes:

a two-dimensional array of electrically conductive tapered projections wherein neighboring pairs of the electrically conductive tapered projections form RF pixels; and RF mixers, wherein each RF mixer is connected to mix the RF signal received by a corresponding RF pixel with the LO signal to generate an RF intermediate frequency (IF) signal, the broadband RF signal data received by each RF receiver being IF signals output by the RF mixers of the DSA.

4. The broadband RF imaging device of claim 3 wherein each RF mixer includes an anti-aliasing filter.

5. The broadband RF imaging device of claim 2 wherein the at least one RF receiver includes a plurality of RF receivers, and the two-dimensional array of electrically conductive tapered projections is disposed on two or more substrates whereby the DSA comprises a corresponding two or more DSA tiles, each DSA tile having RF connections with at least one RF receiver.

6. The broadband RF imaging device of claim 1 wherein the at least one RF receiver includes a plurality of RF receivers, the broadband RF imaging device further comprising a reference oscillator outputting a reference signal to the RF receivers to synchronize the RF receivers.

7. The broadband RF imaging device of claim 6 wherein the reference oscillator comprises a Global Positioning System (GPS) disciplined oscillator.

8. The broadband RF imaging device of claim 1 further comprising:
an Ethernet hub via which the computer is connected to receive the digitized broadband RF signal data stored locally at the at least one RF receiver.

9. The broadband RF imaging device of claim 1 further comprising:
a calibration RF signal antenna positioned at a predefined location respective to the broadband RF aperture array and configured to output a calibration RF signal at a predefined time during the sampling time period;
wherein the computer is programmed to reconstruct the RF image by operations including performing frequency and/or phase correction of the digitized broadband RF signal data based on the predefined location and a portion of the digitized broadband RF signal data representing the calibration RF signal received at the broadband RF aperture array.

10. A broadband radio frequency (RF) imaging method comprising:
over a sampling time period, receiving a broadband RF signal from a physical environment with a broadband RF aperture array having a bandwidth of at least 700 MHz connected with at least one RF receiver having RF connections with the broadband RF aperture array of length 10 meters or less and digitizing the received broadband RF signal to produce a digitized broadband RF signal using the at least one RF receiver and storing the digitized broadband RF signal locally at the at least one RF receiver;
after the sampling time period is complete, transferring the digitized broadband RF signal stored locally at the at least one RF receiver to a computer; and
using the computer, reconstructing an RF image of the physical environment from the digitized broadband RF signal data transferred from the at least one RF receiver.

11. The broadband RF imaging method of claim 10 wherein the broadband RF aperture array comprises a differential segmented aperture (DSA) and the receiving of the broadband RF signal from the physical environment includes detecting RF signals using RF pixels of the DSA wherein each RF pixel comprises a neighboring pair of electrically conductive tapered projections of the DSA.

12. The broadband RF imaging method of claim 11 wherein the receiving of the broadband RF signal from the physical environment further includes:
generating a local oscillator (LO) signal using the at least one RF receiver;
transmitting the LO signal from the at least one RF receiver to the DSA via the RF connections;
at the DSA and for each RF pixel of the DSA, mixing the signal RF detected using the RF pixel with the LO signal using a mixer integrated with the DSA to generate an intermediate frequency (IF) signal, wherein the received broadband RF signal data comprises the IF signals output by the RF mixers of the DSA.

13. The broadband RF imaging method of claim 12 wherein generating of the IF signal further includes performing antialiasing filtering of the IF signal.

14. The broadband RF imaging method of claim 10 wherein at least one RF receiver includes a plurality of RF receivers and the receiving of the broadband RF signal from the physical environment further includes:
synchronizing the RF receivers using reference RF signal that is output to the RF receivers by a reference oscillator.

15. The broadband RF imaging method of claim 14 further comprising generating the reference RF signal using a Global Positioning System (GPS) disciplined oscillator in which a crystal oscillator is disciplined by a GPS receiver in a tracking loop.

16. The broadband RF imaging method of claim 14 further comprising:
an Ethernet hub via which the computer is connected to receive the digitized broadband RF signal data stored locally at the plurality of RF receivers.

17. The broadband RF imaging method of claim 10 further comprising:
during a predefined time within the sampling time interval, outputting a calibration RF signal from a predefined location;
wherein the reconstructing of the RF image of the physical environment includes performing frequency and/or phase correction of the digitized broadband RF signal data transferred from the at least one RF receiver based on the predefined location and a portion of the digitized broadband RF signal data representing the calibration RF signal received at the broadband RF aperture array.

18. A broadband radio frequency (RF) test device comprising:
a differential segmented aperture (DSA) having a bandwidth of at least 700 MHz and comprising a two-dimensional array of electrically conductive tapered projections;
at least one RF receiver having RF connections with the DSA to receive RF signal data from the DSA, the at least one RF receiver configured to digitize the received RF signal data and locally store the digitized RF signal data at the at least one RF receiver; and
a computer connected to receive the digitized RF signal data locally stored at the at least one RF receiver, the computer programmed to perform processing of the digitized RF signal data received from the at least one RF receiver.

19. The broadband RF test device of claim 18 wherein the at least one RF receiver includes a plurality of RF receivers, the broadband RF test device further comprising a Global Positioning System (GPS) disciplined reference oscillator outputting a reference signal to the RF receivers to synchronize the RF receivers.

20. The broadband RF test device of claim 18 further comprising:
   a calibration RF signal source positioned at a predefined location respective to the broadband RF aperture array and configured to output a calibration RF signal;
   wherein the processing of the digitized RF signal data performed by the computer includes performing frequency and/or phase correction of the digitized broadband RF signal data based on the predefined location and a portion of the digitized broadband RF signal data representing the calibration RF signal.

* * * * *